US006459265B1

(12) United States Patent
Lou et al.

(10) Patent No.: US 6,459,265 B1
(45) Date of Patent: Oct. 1, 2002

(54) METHOD AND APPARATUS FOR REDUCING INPUT IMPEDANCE OF A PREAMPLIFIER

(75) Inventors: Xiaoming Lou, Waukesha; Robert Steven Stormont, Hartland; Eddy Benjamin Boskamp, Menomonee Falls; Ricardo Becerra, Waukesha; John Francis Prendergast, Sr., Franklin; Paul Douglas Haig, Milwaukee, all of WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/199,508

(22) Filed: Nov. 25, 1998

(51) Int. Cl.[7] .................................................. G01V 3/00
(52) U.S. Cl. ........................................ 324/322; 324/318
(58) Field of Search .......................... 307/107; 324/306, 324/307, 322; 73/204; 330/282, 277; 341/139; 367/67; 323/208

(56) References Cited

U.S. PATENT DOCUMENTS 4,255,968 A * 3/1981 Harpster ..................... 307/107
4,882,541 A * 11/1989 Haragashira ................ 324/322
4,890,062 A * 12/1989 Haragashira ................ 324/322
5,570,022 A * 10/1996 Ehnholm et al. ........... 324/319
5,909,120 A * 6/1999 Mori et al. ................. 324/322
6,025,720 A * 2/2000 Lenz et al. ................. 324/322
6,369,550 B1 * 4/2002 Lou et al. ................... 323/208

* cited by examiner

*Primary Examiner*—Edward Lefkowitz
*Assistant Examiner*—Tiffany A. Fetzner
(74) *Attorney, Agent, or Firm*—Fletcher, Yoder & Van Someren

(57) ABSTRACT

A feedback circuit is provided for reducing the input impedance of a preamplifier circuit, such as for use with a sensing coil in an imaging system. The feedback circuit permits adjustment of the input impedance by balancing inductive and capacitive components of a feedback control circuit. The imaginary component of the input impedance may be adjusted independently of the real component, to provide a substantially zero input impedance, while allowing adjustment of the stability of the system. The circuitry may function in conjunction with a reactance matching circuit to reduce cross-talk in multiple sensing coil arrangements.

15 Claims, 5 Drawing Sheets

METHOD AND APPARATUS FOR REDUCING INPUT IMPEDANCE OF A PREAMPLIFIER

FIELD OF THE INVENTION

The present invention relates generally to the field of signal amplification circuitry, such as circuitry used in medical diagnostic systems, and stability techniques used to enhance performance of such amplification circuitry. More particularly, the invention relates to a technique for reducing input impedance of a preamplifier circuit, such as a preamplifier in a magnetic resonance imaging system to reduce crosstalk between signals originating in phased array and other coils.

BACKGROUND OF THE INVENTION

Magnetic resonance imaging systems have found increasing applicability for a variety of imaging tasks, particularly in the medical field. Such systems typically include coil assemblies for generating magnetic fields used to control and excite gyromagnetic materials in a subject of interest, such as in soft tissues of a patient. A body coil is typically employed for generating a highly uniform magnetic field along a principal axis of the subject. A series of gradient coils generate spatially varying magnetic fields to select a portion of the subject to be imaged, and to spatially encode sensed signals emitted by unitary volumes within the selected slice. The gradient fields may be manipulated to orient the selected image slice, and to perform other useful imaging functions.

Sensing coils are employed in conventional MRI systems and are adapted to the particular type of image to be acquired. Such sensing coils are highly sensitive to emissions from the subject positioned within the primary and gradient fields. Such emissions, collected during data acquisition phases of imaging, serve to generate raw data signals which may be processed to extract information relating to the nature and location of gyromagnetic material in the subject. Where the region to be imaged is relatively small, a single channel surface coil may be employed. For example, a linear shoulder coil is typically employed for producing images of a human shoulder. For larger images, large single coils may be employed, or multiple coils may be used, such as in "phased array" arrangements. However, the use of large surface coils tends to result in lower signal-to-noise ratios in the acquired image data. Phased array coil assemblies are, therefore, commonly employed to produce images of larger areas, while providing an acceptable signal-to-noise ratio.

Signals acquired by surface coils in MRI systems are typically amplified in one or more preamplifier circuits prior to further signal processing. For example, in phased array coil systems, output signals from each of several adjacent coils are independently amplified in the preamplifiers prior to processing of the signals for generation of the image data. In a typical phased array arrangement, several adjacent coils are provided for receiving the signals emitted by the gyromagnetic material during the signal acquisition phase of imaging. A problem in such systems arises from crosstalk between adjacent coils. To limit or reduce such crosstalk, one common approach is to overlap adjacent coils in the system. Due to the current-carrying paths established by each coil, such overlapping reduces or cancels mutual inductive coupling between the coils, thereby reducing crosstalk. However, such overlap techniques are not always feasible, depending upon the coil configuration.

Another technique for reducing crosstalk in multi-channel imaging coils involves the provision of an LC matching network and a preamplifier. In this technique, a high resistance to induced current flow in coils in receiving mode is provided by the LC network connected to the preamplifier. To provide the maximum resistance to such induced current, the input impedance of the preamplifier must be kept to a minimum. In existing systems of this type, small input impedances, on the order to 2–5 ohms are typical. However, even such low impedance levels are not sufficient for certain multi-channel coil structures, such as multi-channel brain coils. Thus, while the LC matching approach is generally preferable to the overlapping coil technique, further reduction in the input impedance for the preamplifiers used in such imaging systems is still needed.

SUMMARY OF THE INVENTION

The invention provides a novel technique for reducing the input impedance for a preamplifier, such as for use in a magnetic resonance imaging system designed to respond to this need. The technique permits the input impedance of the preamplifier circuit to be reduced to a level of substantially zero. The circuitry providing the input impedance adjustment may permit imaginary and real components of the input impedance to be adjusted independently. Accordingly, the imaginary component of the input impedance may be adjusted to a substantially zero level, followed by subsequent adjustment of the real component. The circuitry conveniently includes a feedback circuit wherein a solid state amplification device is coupled between the amplifier input and output nodes. The feedback circuit has a capacitance level which is balanced by adjustment of a feedback control circuit. The circuitry may be coupled to a reactance matching circuit and reduces the input impedance of the amplifier.

DETAILED DESCRIPTION OF THE INVENTION

Figure 1:
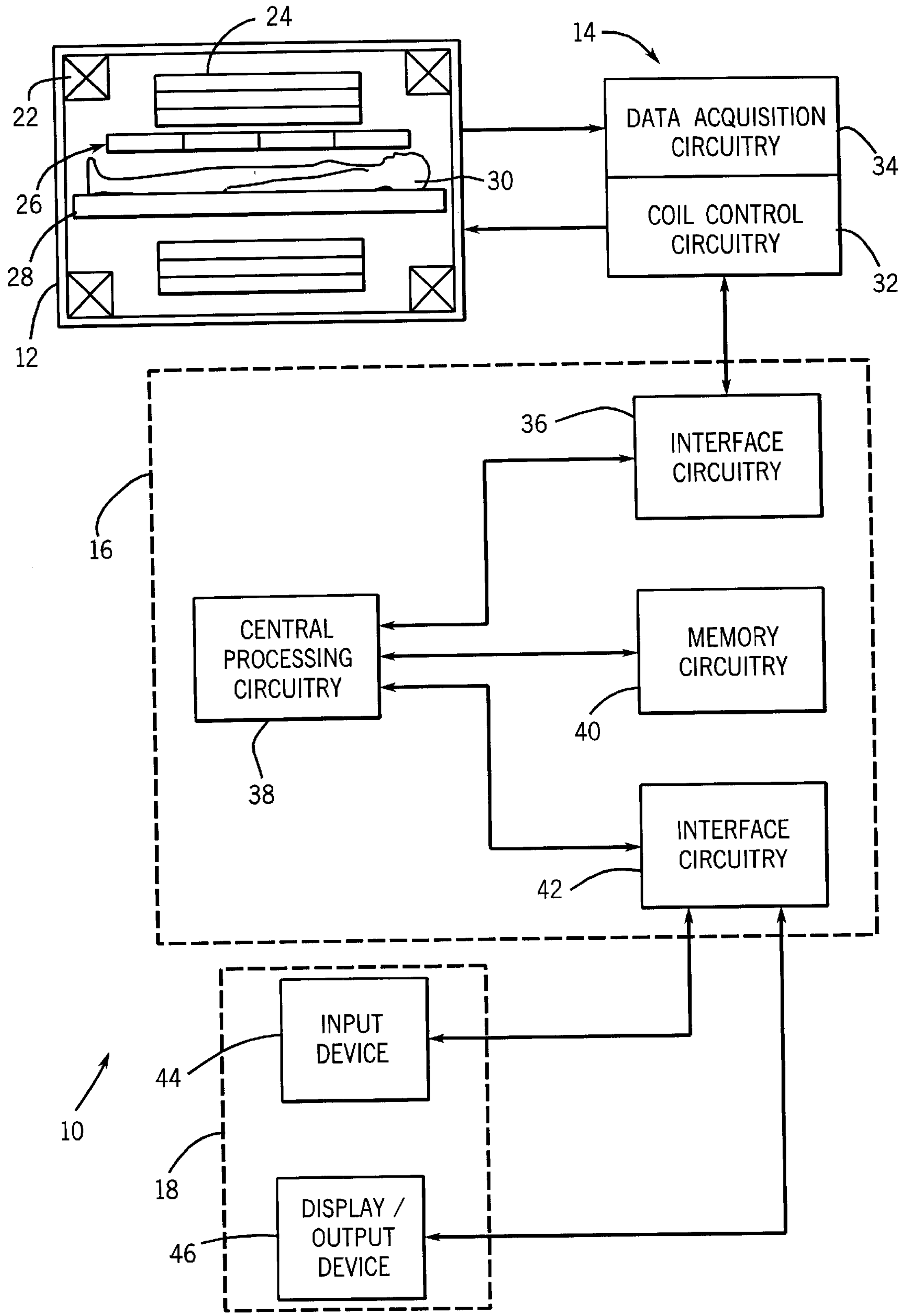
FIG. 1 is a diagrammatical representation of a magnetic resonance imaging system incorporating a multi-channel receiving coil for creating images of a subject of interest.

Referring now to FIG. 1, a magnetic resonance imaging system, designated generally by the reference numeral 10, is illustrated as including a scanner 12, control and acquisition circuitry 14, system controller circuitry 16, and an operator interface station 18. Scanner 12, in turn, includes coil assemblies for selectively generating controlled magnetic fields used to excite gyromagnetic materials in a subject of interest. In particular, scanner 12 includes a primary coil 22, which will typically include a superconducting magnet coupled to a cryogenic refrigeration system (not shown). Coil 22 generates a highly uniform magnetic field along a longitudinal axis of the scanner. A series of gradient coils 24 are also provided for generating controllable gradient fields having desired orientations with respect to the subject of interest. In particular, as will be appreciated by those skilled in the art, gradient coils 24 produce fields in response to pulsed signals for selecting an image slice, orienting the image slice, and encoding excited gyromagnetic material within the slice to produce the desired image.

A series of receiving coil assembly 26 are provided for detecting emissions from gyromagnetic material during data acquisition phases of operation of the system. Coil assembly 26 also transmit controlled pulses during periods of the imaging sequence. A table 28 is positioned within scanner 12 to support a subject 30. While a full body scanner is illustrated in the exemplary embodiment of FIG. 1, the technique described below may be equally well applied to various alternative configurations of systems and scanners, including smaller scanners, and scanners incorporating single channel, phased array and similar receiving coil structures. Moreover, the impedance reducing techniques described below may find application outside of the field of magnetic resonance imaging, and outside of the field of medical imaging in general.

In the embodiment illustrated in FIG. 1, control and acquisition circuitry 14 includes coil control circuitry 32 and data acquisition circuitry 34. Coil control circuitry 32 receives pulse sequence descriptions from system controller 16, notably through interface circuitry 36 included in the system controller. As will be appreciated by those skilled in the art, such pulse sequence descriptions generally include digitized data defining pulses for exciting coils 24 and 26 during excitation and data acquisition phases of imaging. Fields generated by the coils excite gyromagnetic material within the subject 30 to cause emissions from the material. Such emissions are detected by a receiving coil assembly 26 and are filtered, amplified, and transmitted to data acquisition circuitry 34. Data acquisition circuitry 34 may perform preliminary processing of the detected signals, such as amplification of the signals as described below. Following such processing, the amplified signals are transmitted to interface circuitry 36 for further processing.

In addition to interface circuitry 36, system controller 16 includes central processing circuitry 38, memory circuitry 40, and interface circuitry 42 for communicating with operator interface station 18. In general, central processing circuitry 38, which will typically include a digital signal processor, a CPU or the like, as well as associated signal processing circuitry, commands excitation and data acquisition pulse sequences for scanner 12 and circuitry 14 through the intermediary of interface circuitry 36. Circuitry 38 also further processes image data received via interface circuitry 36, to perform 2D Fourier transforms to convert the acquired data from the time domain to the frequency domain, and to reconstruct the data into a meaningful image. Memory circuitry 40 serves to save such data, as well as pulse sequence descriptions, configuration parameters, and so forth. Interface circuitry 42 permits system controller 16 to receive and transmit configuration parameters, image protocol and command instructions, and so forth.

Operator interface station 18 includes one or more input devices 44, along with one or more display or output devices 46. In a typical application, input device 44 will include a conventional operator keyboard, or other operator input devices for selecting image types, image slice orientations, configuration parameters, and so forth. Display/output device 46 will typically include a computer monitor for displaying the operator selections, as well as for viewing scanned and reconstructed images. Such devices may also include printers or other peripherals for reproducing hard copies of the reconstructed images.

Figure 2:
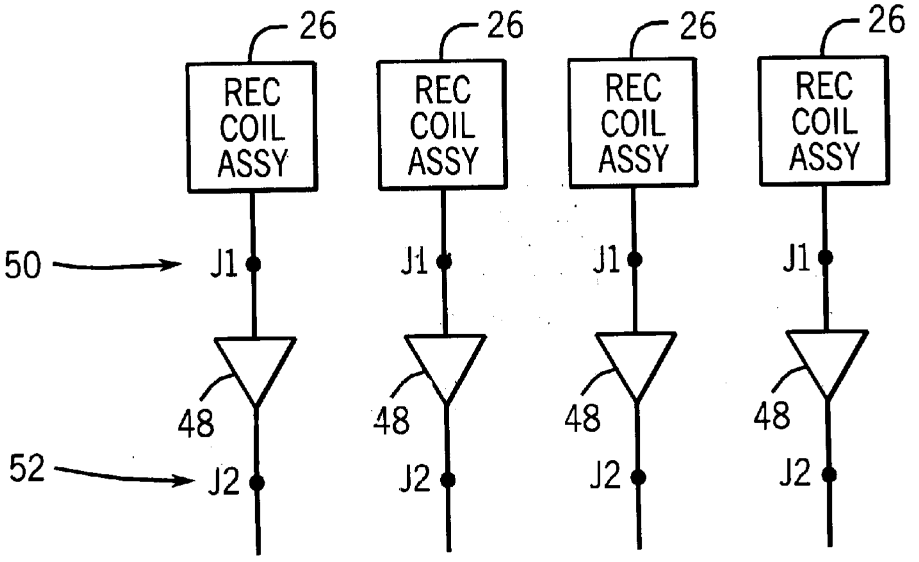
FIG. 2 is a diagrammatical representation of the multi-channel receiving coil of FIG. 1 and associated preamplifiers for amplifying signals received by the individual coils.

As shown in the diagrammatical representation of FIG. 2, each receiving coil assembly 26 is coupled to a preamplifier 48 for enhancing signals detected by the coils. An input junction point J1, designated by reference numeral 50 in FIG. 2, represents a point at which the preamplifier is coupled to a respective coil. An output junction point J2, designated by the reference numeral 52 in FIG. 2, represents a point at which each preamplifier for each coil is coupled to downstream circuitry for further processing of the amplified signals. In the illustrated embodiment, preamplifiers 48 will typically be included within data acquisition circuitry 34, and signals output at junction points 52 will be applied to a circuitry within system controller 16.

Figure 3:
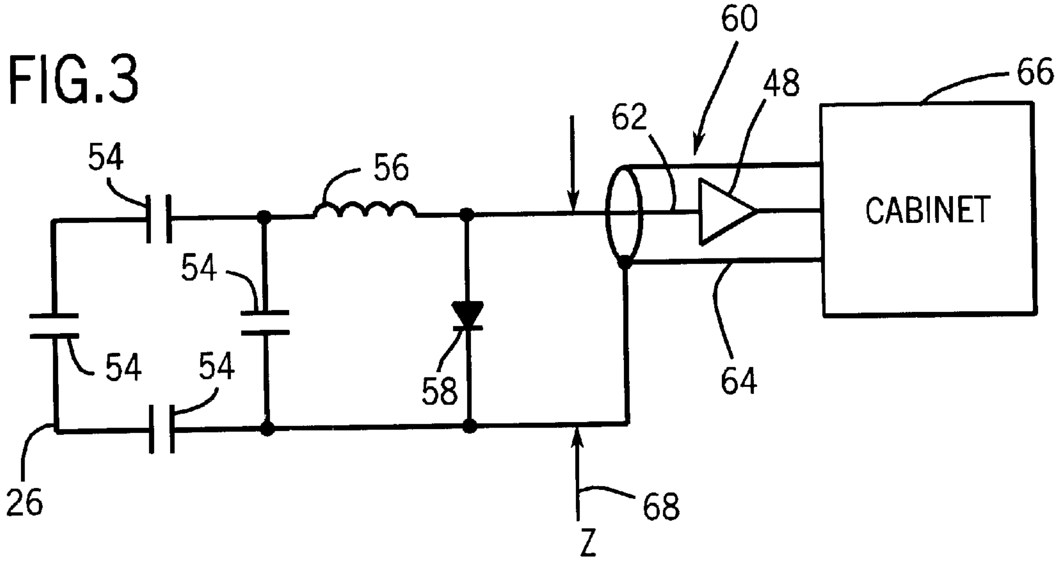
FIG. 3 is a schematic representation of a reactance matching network for reducing crosstalk between coils of the type included in the arrangement of FIG. 2.

FIG. 3 illustrates a typical reactance matching network including equivalent circuitry as defined by an element of coil assembly 26. As illustrated in FIG. 3, coil assembly 26 effectively defines a series of equivalent capacitances 54 coupled in a ring network. An output node of the coil is coupled to preamplifier 48 through an inductance 56. A diode 58 is provided between an output node of inductance 56 and a second output node of coil assembly 26. In parallel with diode 58, output from coil assembly 26 is coupled to a co-axial cable 60. Inductance 56 is coupled to an inner conductor 62 of the cable, and therethrough to preamplifier 48. The opposite output node of coil assembly 26 is coupled to a shield 64 of the co-axial cable. This shield is also grounded to a cabinet 66 or similar structure of the imaging system.

As will be appreciated by those skilled in the art, the equivalent circuitry of FIG. 3 establishes an LC network which provides a significant resistance to the flow of induced current through coil assembly 26 if the impedance Z, indicated at numeral 68, is low. To maximize the resistance to such induced current flow, and thereby reduce crosstalk between coils of assembly 26, it is desirable to minimize the input impedance between conductor 62 and shield 64, as indicated at reference numeral 68 in FIG. 3.

Figure 4:
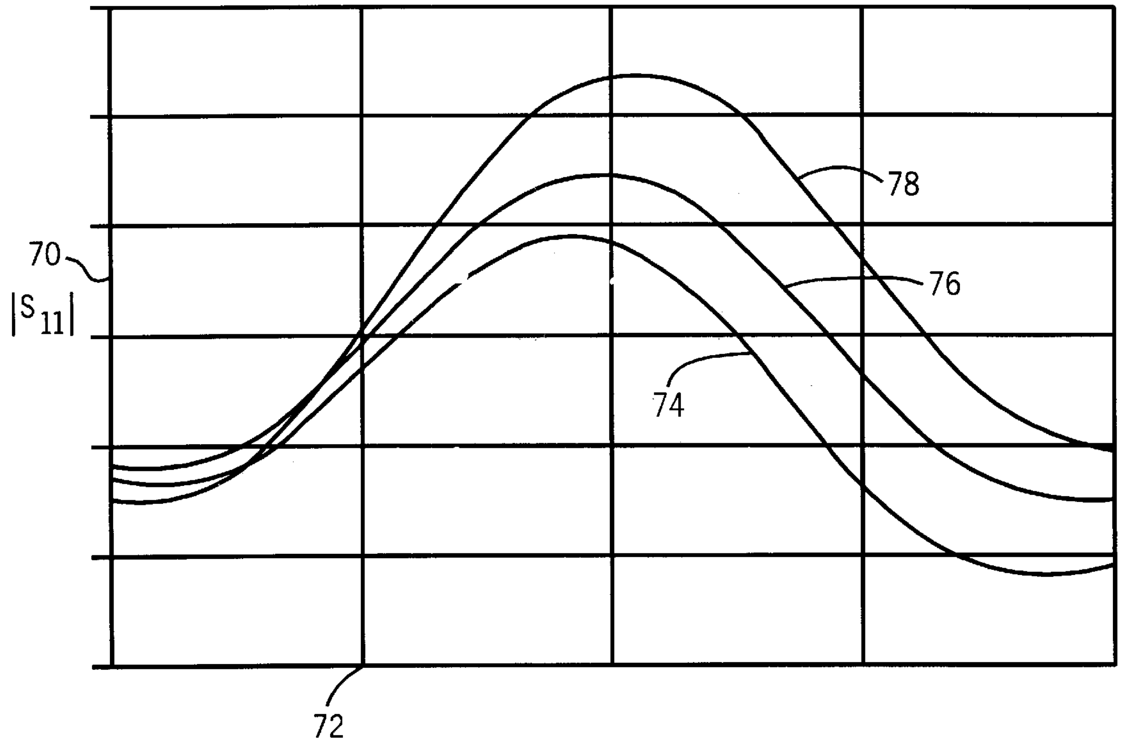
FIG. 4 is a graphical representation of the effect of capacitive and inductive feedback on input impedance in a circuit of the type shown in FIG. 3.

FIG. 4 represents the effect of capacitive and inductive feedback on input impedance of the preamplifier 48. In particular, FIG. 4 illustrates several frequency versus impedance curves, with a value $|S_{11}|$ being indicated along vertical axis 70, and frequency, in MHz, being represented along a horizontal axis 72. FIG. 4 illustrates three exemplary cases of input impedance curves about a nominal operating frequency. For example, a nominal operating frequency of approximately 64 MHz is anticipated for receiving coils of a 1.5 Tesla-rated MRI system. A first curve 74 illustrates optimal tuning for input impedance in accordance with the present technique, wherein a slightly negative, but near zero impedance is obtained by proper balancing of capacitive and inductive feedback. As the inductive component of the feedback is reduced, the curve is shifted upwardly, and slightly to the right, as indicated at curve 76. Further reduction in the inductive component of the feedback, or increase in the capacitive component, shifts the input impedance curve further in a positive direction, as indicated by curve 78 in FIG. 4. In accordance with the present technique, circuitry is provided for facilitating proper balancing of capacitive and inductive feedback components upstream of a preamplifier. The circuitry thus permits optimal tuning to be obtained to maintain the input impedance to the preamplifier at a desired level, as indicated by the curves of FIG. 4.

Figure 5:
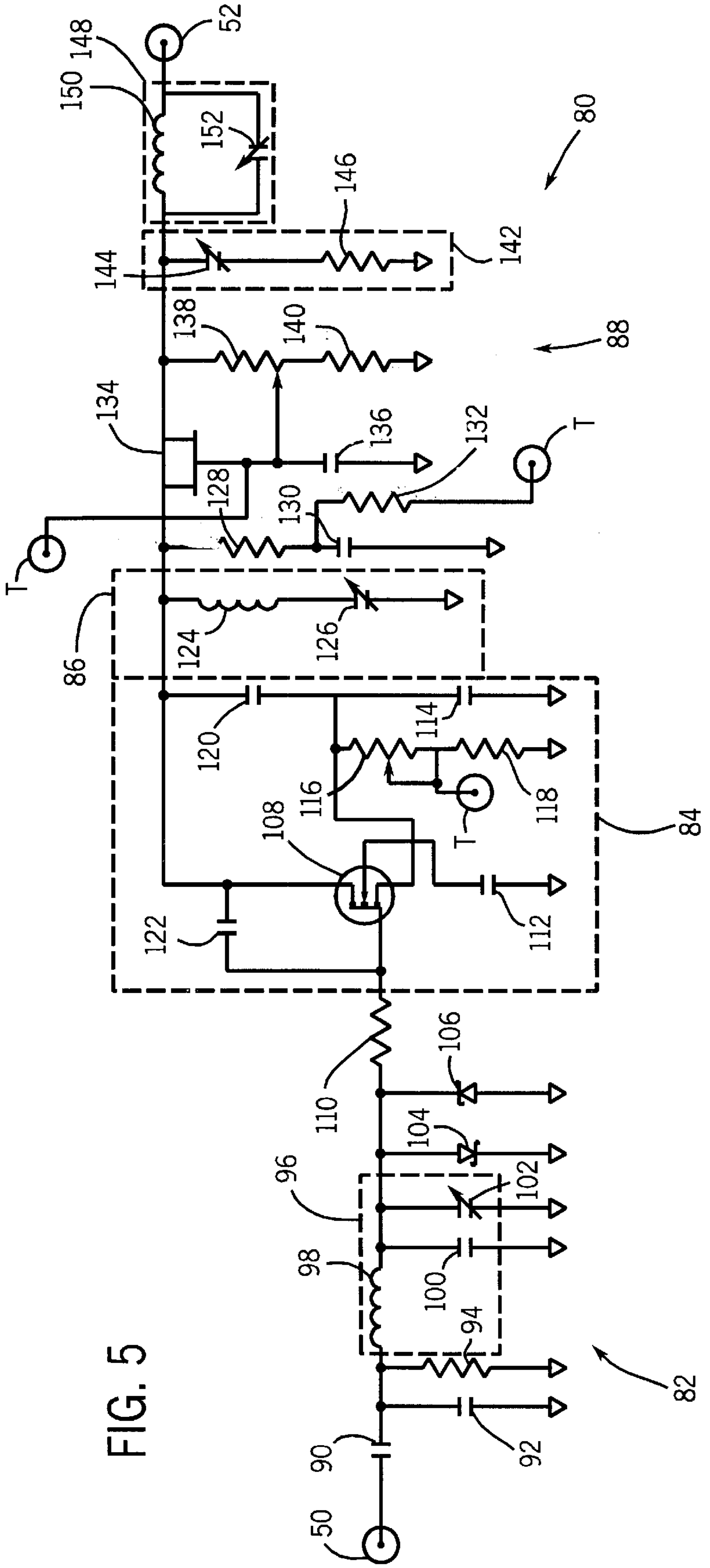
FIG. 5 is a schematic representation of a coil preamplifier circuit for use with coils of the type shown in FIG. 2 for reducing input impedance into a preamplifier to a level substantially equal to zero.

Presently preferred circuitry permitting tuning of preamplifier input impedance is illustrated in FIG. 5, and designated generally by reference numeral 80. Circuitry 80 includes preamplification circuitry and tuning circuitry for providing the balanced inductive and capacitive feedback summarized above. Input to circuitry 80 is provided at junction J1, indicated by reference numeral 50 on the left of FIG. 5, while output from the circuitry is provided at junction J2, as indicated at reference numeral 52 on the right of FIG. 5. In general, circuitry 80 includes input circuitry 82 which provides for impedance transforming from 50 ohms to an optimal noise match impedance to solid state device 108. The first stage amplification circuit, designated generally at reference numeral 84, provides the feedback required to reduce the input impedance to a desired level, substantially equal to zero. A tunable feedback control circuit 86 is coupled to first stage circuit 84 and facilitates tuning of the capacitive and inductive feedback components as described more fully below. Finally, an output stage 88 is provided for further stabilization, gain control and output matching.

Referring more particularly now to the preferred embodiment of circuitry 80, as shown in FIG. 5, signals received at junction point J1 are applied to a DC block capacitor 90. Downstream of capacitor 90, a second capacitor 92 and a resistor 94 are coupled in parallel to an analog ground potential. Capacitor 92 provide for amplification stability, while resistor 94 further provides DC bias to the analog ground potential.

Downstream of capacitor 90, input circuit 82 includes a tunable input section 96, including components which can be tuned during manufacturing to provide a capacitive and inductive balance in the input section. In particular, tunable input section 96 includes an inductor 98, a fixed capacitor 100 and an adjustable capacitor 102. Capacitors 100 and 102 are coupled downstream of inductor 98, in parallel with one another and in series with the analog ground potential. Capacitor 102 is adjustable to match the inductance of inductor 98 during manufacturing. In parallel with capacitors 100 and 102, a pair of Schottky diodes 104 and 106 are provided for protecting first stage amplification circuit 84.

The signals filtered by input circuit 82 are applied directly to first stage circuit 84. Circuit 84 includes a solid state amplification device in the form of a GaAsFET 108, which provides internal capacitive feedback as described in greater detail below. Signals processed by input circuit 82 are applied to the gate of GaAsFET 108 through a stabilizing resistor 110. The base of GaAsFET 108 is coupled to the rf analog ground potential through a capacitor 112, while the source of GaAsFET 108 is similarly coupled to the analog rf ground potential through a similar capacitor 114. In parallel with capacitor 114, a tunable DC bias circuit is defined by a variable resistor 116 and a fixed resistor 118 in series with the analog ground potential. Resistors 116 and 118 permit the DC bias on the source of GaAsFET 108 to be adjusted, while capacitors 112 and 114 prevent or reduce noise which may be transmitted through the resistors. The drain of GaAsFET 108 is also coupled to capacitor 114 through a series capacitor 120 which provides for high frequency stability.

In the embodiment illustrated in FIG. 5, an internal capacitance 122 exists between the gate and drain of GaAsFET 108. In general, this capacitance will be rated for the particular device employed in the circuit, such as by reference to a Cgd value for GaAsFET 108. As will be appreciated by those skilled in the art, rather than, or in addition to internal capacitance 122, an external component may be employed, particularly if the frequency of operation is sufficiently low.

The capacitive feedback afforded by circuit 84 is tuned and balanced by feedback control circuit 86. In particular, in the illustrated embodiment, circuit 86 receives output signals from the drain of GaAsFET 108. Circuit 86, in turn, includes an inductor 124 in series with an adjustable capacitor 126. Capacitor 126 is coupled to the analog ground potential. As described in greater detail below, inductor 124 and capacitor 126 define an adjustable inductance, the level of which is tuned by adjustment of capacitor 126 to provide the desired input impedance for the preamplifier.

Downstream of feedback control circuit 86, a resistor and capacitor pair 128 and 130 are provided for a high frequency stability. In parallel with capacitor 130, a resistor 132 is provided for isolating a test tap point as described below.

Output amplification stage 88 includes a JFET 134 which receives signals from feedback control circuit 86 at its source. The gate of JFET 134 is coupled to the analog rf ground potential through a capacitor 136. The drain of JFET 134 is coupled to a tunable resistor pair 138 and 140, in parallel with capacitor 136. Resistors 138 and 140 provide for an adjustable DC bias for JFET 134, while capacitor 136 prevents or reduces noise transmitted through the resistors. JFET 134, along with its associate circuitry, acts as a buffer reducing feedback from junction point J2 to junction point J1 for stability.

Downstream of JFET 134, output amplification stage 88 includes a gain control circuit 142 and output matching circuit 148. Circuit 142, in turn, includes an adjustable capacitor 144 in series with a resistor 146. Resistor 146 is coupled to the analog ground potential. Capacitor 144 is adjustable to regulate the gain of circuit 80. Output from circuit 142 is applied to output matching circuit 148. Circuit 148 includes a capacitive-inductive network, comprising an inductor 150 in parallel with an adjustable capacitor 152. Capacitor 152 is adjustable to match the rating of a coaxial cable which will be coupled to junction point 52.

In the embodiment illustrated in FIG. 5, several tests or tap points are provided for facilitating adjustment of the circuit during manufacture or following manufacture. In particular, the illustrated embodiment includes three such points, labeled “T” in FIG. 5. These are provided between resistors 116 and 118, in series with resistor 132, and at the gate of JFET 134. As it will be appreciated by those skilled in the art, the tap points may be defined by vias in a circuit board on which circuit 80 is formed and permit manufacturing personnel or devices to regulate the adjustable components of the circuit.

As it will be appreciated by those skilled in the art, variations on the preferred configuration of circuit 80 shown in FIG. 5 may be envisaged. Similarly, the ratings of the various components will typically be selected depending upon the frequencies anticipated in the system, the impedance levels of the upstream and downstream circuits and so forth. In the illustrated embodiment, the foregoing components have the following ratings:

Capacitor 90 0.01 microF;
Resistor 94 5.62 kohm;
Capacitor 102 1–5 P, 250 V, var.;
Resistor 110 18.8 kohm;

Capacitor 112 0.01 microF;
Capacitor 114 0.01 microF;
Resistor 116 108 kohm;
Resistor 118 18.8 kohm;
Capacitor 120 5 picoF;
Capacitor 126 6–25 P,100 V, var.;
Resistor 128 39 kohm;
Capacitor 130 4 picoF;
Resistor 132 100 kohm;
Capacitor 136 0.01 microF;
Resistor 138 75.0 kohm;
Resistor 140 50 kohm;
Capacitor 144 6–25 P, 100 V, var.;
Resistor 146 68 ohm; and
Capacitor 152 6–25 P, 100 V, var.

In addition, certain of the components may be selected depending upon the type of system employed and other system ratings. For example, in the illustrated embodiment, circuit 80 is intended to provide for adjusting input impedance to a preamplifier coupled to a receiving coil of an MRI system. Components of circuit 80 are particularly adapted to the primary field or $B_0$ rating of the system. In particular, the following ratings are employed for two different systems, having $B_0$ ratings of 1.5 Tesla and 1 Tesla, respectively:

| Component | $B_0$ = 1.5 T | $B_0$ = 1 T |
|---|---|---|
| Capacitor 100 | 3 picoF | 10 picoF |
| Capacitor 92 | 1 picoF | 15 picoF |
| Inductor 98 | 0.60 microH | 0.72 microH |
| Inductor 150 | 0.27 microH | 0.56 microH |
| Inductor 124 | 0.62 microH | 0.91 microH |
| Resistor 146 | 68 ohms | 56 ohms. |

Figure 6:
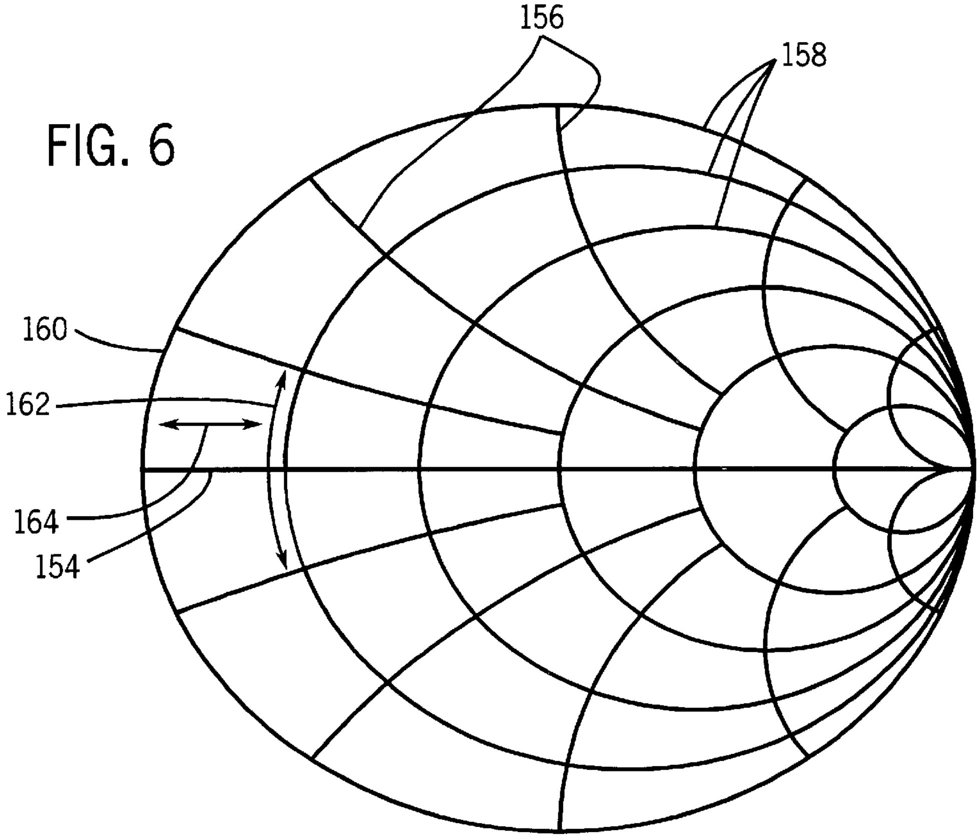
FIG. 6 is a stability diagram illustrating a preferred manner in which the circuit of FIG. 5 is tuned to provide a stable configuration with minimal input impedance to a preamplifier.

As will be appreciated by those skilled in the art, circuit 80 facilitates adjustment of impedance at input junction J1 between inductive and capacitive components, as discussed above with reference to FIG. 4. In particular, following initial adjustment of DC biases, capacitances and so forth as discussed above, the impedance at junction point J1 may be adjusted by proper adjustment of capacitors 102, 126 and 122. FIG. 6 illustrates a Smith diagram for circuit 80, showing a presently preferred method of adjusting these components to obtain a desired input impedance. As will be appreciated by skilled in the art, the input impedance of circuit 80 may be expressed as a function of real and imaginary components in accordance with the relationship:

$$Z=R+jX \tag{1}$$

where Z is the input impedance at junction point J1, R is the real component of the impedance, and X is the imaginary component.

The diagram of FIG. 6 shows a real axis 154 extending from a point of Zero ohm marginal stability on the left to a point of infinity on the right. Lines 156 of constant imaginary components X of the impedance curve from upper and lower sides of real axis 154. Lines 158 of constant real components R of the impedance loop about the real axis. A line 160 of marginal stability forms a limit about a region within which a passive impedance is defined, and outside of which an active impedance is defined. The particular diagram of FIG. 6 is produced for a frequency range from 50 to 70 MHz, and is normalized for a reactance matching of 50 ohms.

The configuration of circuit 80 described above facilitates adjustment of the input impedance as follows. First, capacitor 102 is adjusted, as indicated by arrow 162 in FIG. 6. This adjustment step forces the input impedance provided by circuit 82 to lie substantially on real axis 154. It will also be noted that this adjustment minimizes the imaginary component X of the impedance. Next, capacitor 126 is adjusted (or capacitor 122 may be adjusted where a variable capacitor is employed in the feedback circuit), as indicated by arrow 164 to reduce the real component, and hereby the magnitude of the input impedance to a level substantially equal to zero, lying on or closely adjacent to the line of marginal stability 160 at the left of FIG. 6. As mentioned above, in cases where the gate-to-drain capacitance of GaAsFET 108 is supplemented by a component capacitor, this capacitor may also be adjusted in the foregoing tuning sequence, to provide a substantially zero imaginary component of the impedance and a marginally stable overall impedance by proper adjustment of the real component thereof.

Figure 7:
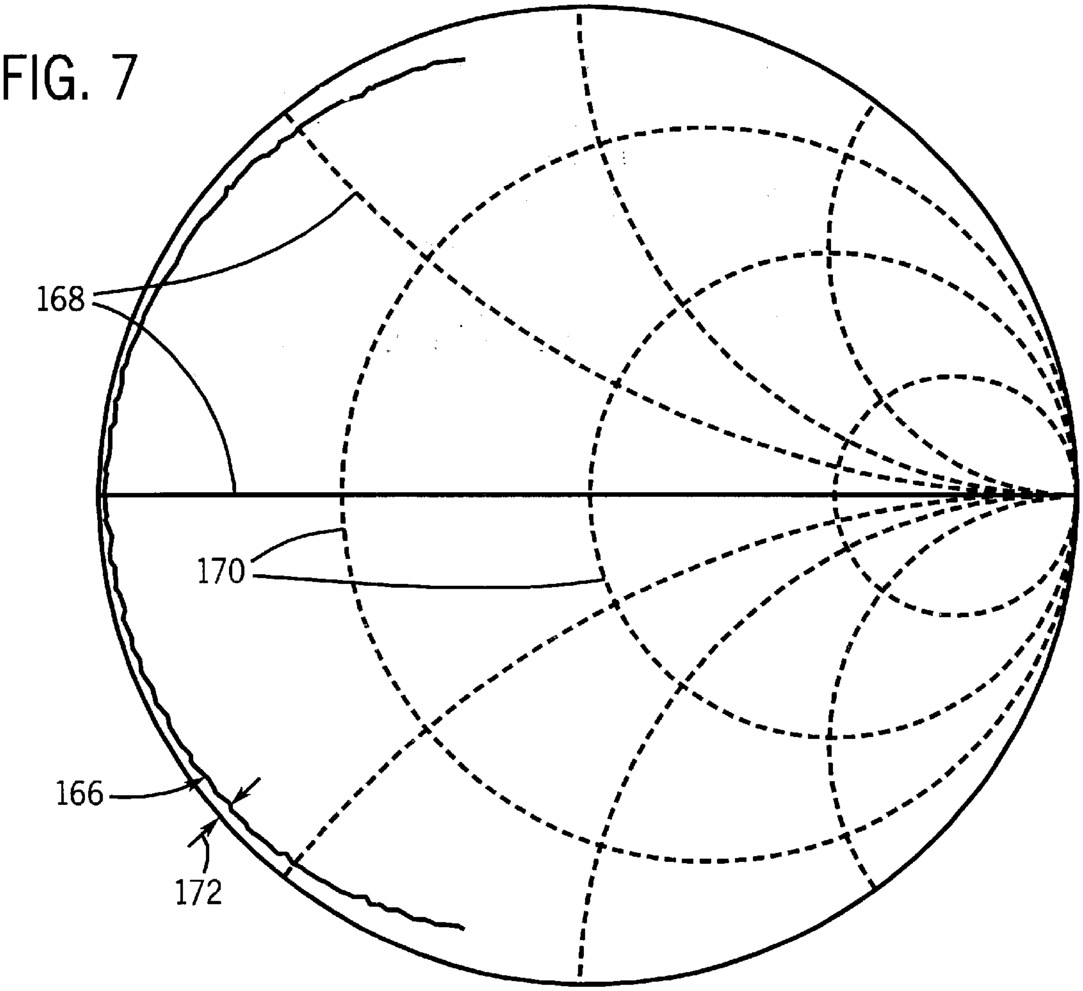
FIG. 7 is a polar impedance graph illustrating the actual input impedance obtained through the present technique using a circuit of the type shown in FIG. 5.

FIG. 7 illustrates a plot of measured impedance obtained through adjustment of a circuit as described above. As shown in FIG. 7, a trace 166 was obtained and plotted in a Smith impedance diagram in which lines 168 represent lines of constant reactance and lines 170 represent lines of constant resistance. As shown in the diagram, the foregoing technique allows the imaginary portion of the input impedance to be driven to a value of zero at the operational frequency of the imaging system, or the Larmor frequency in a magnetic resonance imaging system. In particular, in the illustrated embodiment, trace 166 provides an input impedance of approximately zero ohms at approximately 63.86 MHz. Portions of the trace departing from the minimal impedance point along the horizontal axis fall away from the unit circle, as indicated at reference numeral 172, providing additional stability at frequencies other than the operational frequency.

What is claimed is:

1. A system for controlling input impedance of an amplifier circuit for a magnetic resonance system sensing coil, the system comprising:

an capacitive feedback component coupled between an input node and an output node;

a feedback circuit including a solid state amplification device coupled between the input and output nodes; and a feedback control circuit coupled to the feedback component, the feedback control circuit being adjustable to balance the capacitive feedback component and thereby to permit regulation of impedance at the input node to a level substantially equal to zero, the feedback control circuit further regulating feedback from the feedback circuit.

2. The system of claim 1, wherein the capacitive feedback component is at least partially defined by an internal capacitance of the solid state amplification device.

3. The system of claim 1, wherein the feedback control circuit includes a second capacitive feedback component coupled to an inductive feedback component.

4. The system of claim 3, wherein the second capacitive feedback component is adjustable to regulate an inductive feedback level of the feedback control circuit.

5. The system of claim 1, wherein the capacitive feedback component is adjustable.

6. The system of claim 1, wherein the feedback control circuit includes a variable capacitor, the capacitor being manually adjustable to permit regulation of the input impedance.

7. The system of claim 1, further comprising a tunable input section, the input section including an inductive input component and a capacitive input component, the capacitive input component being adjustable to regulate the input impedance.

8. The system of claim 7, wherein the capacitive input component is adjustable to regulate an imaginary component of input impedance and the capacitive feedback component is adjustable to regulate a real component of input impedance.

9. The system of claim 1, further comprising a gain control circuit including an adjustable gain element for regulating gain of the systems.

10. An magnetic resonance imaging system, comprising:

a scanner including coils for exciting gyromagnetic materials in a subject of interest;

a sensing coil for detecting emissions from the gyromagnetic material; and an amplification circuit coupled to the sensing coil, the amplification circuit including a gain circuit and an input impedance control circuit, the input impedance control circuit being adjustable to regulate impedance at an input node of the amplification circuit to a level substantially equal to zero;

wherein the input impedance control circuit includes an inductive feedback control component and a capacitive feedback control component, the capacitive feedback control component being adjustable to regulate the input impedance; and wherein the amplification circuit includes a feedback circuit including a solid state amplification device, and wherein the input impedance control circuit controls feedback from the feedback circuit.

11. The imaging system of claim 10, further comprising a reactance matching circuit coupled to the input node of the amplification circuit and to a reference potential.

12. The imaging system of claim 10, further comprising an input section including an inductive input component and a capacitive input component, and wherein the capacitive input component is adjustable to regulate an imaginary component of the input impedance and the capacitive feedback control component is adjustable to regulate a real component of the input impedance.

13. The imaging system of claim 10, comprising a plurality of sensing coils and a plurality of adjustable impedance amplification circuits, one of the amplification circuits being coupled to each of the sensing coils.

14. The imaging system of claim 10, wherein the capacitive feedback control component is adjustable to regulate an inductive feedback level as a function of a capacitance of the feedback circuit.

15. The imaging system of claim 14, wherein the capacitance of the feedback circuit is defined by an internal capacitance of the solid state amplification device.

* * * * *